United States Patent
Kim et al.

(10) Patent No.: US 7,604,895 B2
(45) Date of Patent: Oct. 20, 2009

(54) ELECTROCHEMICAL CELL WITH TWO TYPES OF SEPARATORS

(75) Inventors: Je Young Kim, Daejeon (KR); Pil Kyu Park, Daejeon (KR); Soonho Ahn, Daejeon (KR); Sang-Young Lee, Daejeon (KR); SeokKoo Kim, Daejeon (KR); Young Tae Lee, Jeonju-si (KR)

(73) Assignee: LG Chem, Ltd. (KR)

( * ) Notice: Subject to any disclaimer, the term of this patent is extended or adjusted under 35 U.S.C. 154(b) by 988 days.

(21) Appl. No.: 11/091,145

(22) Filed: Mar. 28, 2005

(65) Prior Publication Data

US 2005/0266292 A1    Dec. 1, 2005

(30) Foreign Application Priority Data

Mar. 29, 2004  (KR) ............... 10-2004-0021176
May 6, 2004    (KR) ............... 10-2004-0031683

(51) Int. Cl.
  H01M 2/16  (2006.01)
  H01M 2/14  (2006.01)
  H01M 2/00  (2006.01)
  H01M 8/02  (2006.01)

(52) U.S. Cl. .......... 429/141; 429/231.95; 429/129; 429/135; 429/137; 429/138; 429/142; 429/34; 429/144; 429/145; 429/132

(58) Field of Classification Search ............ None
See application file for complete search history.

(56) References Cited

U.S. PATENT DOCUMENTS 6,447,958 B1 *  9/2002  Shinohara et al. ........... 429/248

FOREIGN PATENT DOCUMENTS

| JP | 10-199502    | * | 7/1998 |
| JP | 2000-082497  |   | 3/2000 |
| JP | 2003-243037  |   | 8/2003 |

* cited by examiner

*Primary Examiner*—Patrick Ryan
*Assistant Examiner*—Angela J. Martin
(74) *Attorney, Agent, or Firm*—Cantor Colburn LLP

(57) ABSTRACT

Provided is an electrochemical device comprising two types of separators having different energy to break, wherein the outermost electrode layer of the electrode assembly includes an active material non-coated cathode, an active material non-coated anode, and a separator (second separator) disposed between the cathode and anode and having relatively low energy to break compared to that of separators (first separator) in other electrode layers. Therefore, it is possible to remarkably improve safety of the battery by inducing primary short-circuiting in the outermost electrode layer of a battery, thus facilitating heat dissipation of the battery, upon application of external impact.

12 Claims, 5 Drawing Sheets

ELECTROCHEMICAL CELL WITH TWO TYPES OF SEPARATORS

FIELD OF THE INVENTION

The present invention relates to an electrochemical device comprising two types of separators each having different energy to break, having remarkably improved safety by primarily inducing short-circuiting in the outermost electrode layer of a battery upon application of external impact.

BACKGROUND OF THE INVENTION

Recently, a great deal of interest has been increasingly directed to energy storage technology. In particular, applicable fields of such energy storage technology have been extended to power sources for portable telecommunication instruments such as mobile phones, camcorders and notebook computers, and further to power sources for electric vehicles (EVs) and hybrid electric vehicles (HEVs). As such, efforts and attempts to research and develop batteries capable of implementing such technology and power sources are increasingly undertaken. In this respect, the field of electrochemical devices has been receiving a great deal of attention, and in particular, a lot of interest has been focused on development of rechargeable secondary cells. In accordance with the trend towards development of such batteries, research and development has been focused on design of a new type of battery and electrode which increases charge density and specific energy.

Among currently applied secondary batteries, lithium ion batteries, developed in the early 1990s, have received a great deal of attention due to their high operation voltage and energy density as compared to traditional batteries using aqueous electrolytes, such as Ni-MH, Ni—Cd and $PbSO_4$ batteries. However, such lithium ion batteries suffer from safety problems associated with flammability and explosiveness, due to use of organic electrolytes, and difficult and complicated manufacturing processes. State-of-the art lithium ion polymer batteries have received a great deal of interest as a next generation battery in which drawbacks exhibited by such lithium ion batteries have been alleviated. However, current lithium ion polymer batteries still have a lower charge capacity than existing lithium ion batteries, and in particular have insufficient discharge capacity at low temperatures, thus urgently requiring improvement in such poor discharge capacity.

The operation mechanism of lithium ion batteries is different than that of conventional batteries. $LiCoO_2$ and graphite, utilized as cathode and anode active materials in lithium ion batteries, respectively, have crystalline structures with cavities therein. Upon charging and discharging the battery, lithium ions migrate inside the battery by entrance and exit of lithium ions into and from the cavities.

The cathode of the battery is a current collector serving to collect electrons and aluminum foil is generally used as the cathode. The active material, $LiCoO_2$ is coated on the aluminum foil. However, $LiCoO_2$ exhibits low electron conductivity and thus carbon is added in order to enhance electron conductivity.

The anode is copper foil coated with graphite, as a current collector. Graphite has superior electron conductivity and generally, electron conductive material is thus not added to the anode.

The anode and cathode are isolated from one another by a separator, and as the electrolyte, liquid prepared by addition of lithium salts to the organic solvent is employed.

Secondary batteries are prepared in a discharged state. Upon charging, lithium ions present in $LiCoO_2$ crystals exit and migrate to the anode and then enter into graphite crystal structures. In contrast, upon discharging, lithium ions in graphite exit and enter crystal structures of the cathode. In this manner, as charging and discharging of the battery proceeds, lithium ions alternate between the anode and cathode, the phenomenon of which is called "rocking chair concept", which corresponds to the operation mechanism of the lithium ion batteries.

Numerous manufacturers produce such batteries but the safety characteristics of the produced batteries vary from one manufacturer to the next. However, evaluation of safety of such batteries and safety securing are very important. The most important consideration is the requirement that the battery must not cause injury to users upon error and malfunction in operation thereof. For this purpose, safety standards strictly regulate fire ignition and fuming or smoking in the battery.

A variety of methods have been conceived to effect safety improvement. In this connection, there has been filed a patent application relating to a technique of fabricating a battery using more than two types of separators. Japanese Patent Publication Laid-open No. Hei 10-199502 discloses a battery having both high tensile strength and high capacity retention properties by stacking two separators having different characteristics between the cathode and anode. In this patent, the first and second separators are based on a polyolefin resin and polyamide resin, respectively.

Japanese Patent Publication Laid-open No. 2000-82497, assigned to Sony Corporation, employs two identical separators that were wound each other, in order to improve cycle characteristics of the battery, but this exhibited battery characteristics irrespective of safety thereof.

Japanese Patent Publication Laid-open No. 2003-243037, assigned to Shin-Kobe Electric Machinery Co., Ltd., discloses a lithium ion battery having improved safety by using two separators having different melting points. Herein, the safety of the battery is improved by inducing primary short-circuiting, when the temperature of the battery elevates, in a second electrode zone that does not occlude/release lithium ions and is composed of the second separator having a lower melting point. However, in this case, the practical range in which the battery can be operated is limited to about 90° C., and thereby, when short-circuiting occurs at below such a temperature range, severe deterioration in battery performance occurs, thus primary short-circuiting is required to occur over 90° C. However, where internal short-circuiting occurs at temperatures higher than 90° C., the practical battery may be exposed to more dangerous situation compared to occurrence of short-circuiting at room temperature, which in turn probably leads to worsening safety of the battery. As a result, this method cannot be a good solution. In addition, use of polymer separators having different melting points considers only elevation of the battery temperature, and has no effects on the battery safety when short-circuiting occurs by external impact such as crushing, partial crushing or the like.

As such, there remains an urgent need in the art for development of an electrochemical device for improving the safety of batteries, upon application of external impact such as crushing, partial crushing or the like.

SUMMARY OF THE INVENTION

As a result of extensive and intensive research and study in order to solve the problems exhibited by conventional arts, the inventors of the present invention have discovered that upon fabricating the battery using two different types of separators having large difference in energy to break therebetween, this constitution leads to induction of primary short-circuiting in response to external impact in the outermost electrode layer including the separator having lower energy to break, thereby improving the safety of the battery, and completed the present invention based on this finding.

Therefore, an object of the present invention is to provide an electrochemical device having improved safety by inducing short-circuiting in the outermost part of a battery, thus facilitating heat dissipation, upon application of external impact.

In accordance with an aspect of the present invention, the above and other objects can be accomplished by the provision of an electrochemical device comprising an electrode assembly including a cathode, an anode and a separator disposed between the cathode and anode, wherein the outermost electrode layer of the electrode assembly includes an active material non-coated anode, an active material non-coated cathode, and a separator disposed between the cathode and anode and having relatively low energy to break compared to that of separators in other electrode layers.

Generally, the cathode and anode, which constitute an electrode assembly of the electrochemical device, are faced to each other in the active material-coated form, respectively. The separator interposed between the cathode and anode (hereinafter, sometimes, simply referred to as "first separator") is made up of materials having high-energy to break, for example, polyolefin polymers such as polyethylene, polypropylene, etc. Also in the electrochemical device in accordance with the present invention, remaining electrode layers, except for the outermost electrode layer, employ the above-mentioned active material-coated cathode and anode, and the first separator having high-energy to break.

Therefore, the electrochemical device in accordance with the present invention, as defined above, has constitutional characteristics in that the constitution of the outermost electrode layer of the electrode assembly is different from that of other electrode layers. That is, the outermost electrode layer includes the cathode and anode faced and uncoated with active materials, respectively, and the separator having relatively low energy to break (hereinafter, sometimes, simply referred as "second separator") interposed therebetween.

The outermost electrode layer including the second separator may be the uppermost electrode layer of the electrode assembly, or the lowermost electrode layer, or both the uppermost and lowermost electrode layers. Preferably, the outermost electrode layer of the electrochemical device is comprised of the outermost electrode layer of the present invention in which the uppermost and lowermost electrode layers of the electrode assembly, respectively, include the second separators.

As used herein, the term "energy to break" refers to the magnitude of energy applied to a separator material upon induction of short-circuiting between electrodes resulting from breakage of the separator interposed between the cathode and anode by applied external impact such as crushing or nail penetration. Preferably, such energy to break may be tensile strength at break (TSB) or tensile energy to break (TEB).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

The present invention will now be described in detail with reference to the preferred embodiments and accompanying drawings.

Figure 1:
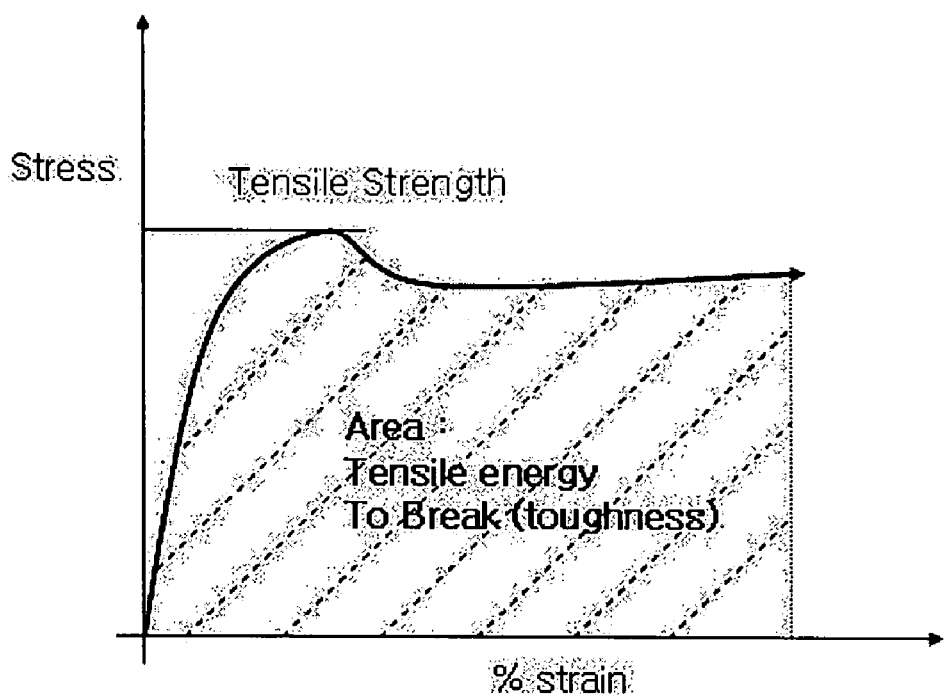
FIG. 1 is a graph of a general stress versus strain curve showing correlation between tensile strength at break and tensile energy.

FIG. 1 depicts a general stress-strain curve showing correlation between tensile strength at break and tensile energy to break. Tensile strength at break refers to the magnitude of stress causing sudden changes in strain. Whereas, tensile energy to break refers to energy until test material is completely broken. Tensile energy to break is defined as an integral value of the area under a stress-strain curve until breakage of test material occurs, as shown in FIG. 1, and is expressed in terms of energy/unit volume of material. Even though many materials exhibit correlation in which tensile strength is generally proportional to tensile energy to break, this is not necessarily the case.

Upon considering this fact, the second separator in the present invention has lower energy to break as compared to the first separator, and thereby when external impact such as crushing or nail penetration is applied to the separator, it is relatively easily broken, primarily resulting in short-circuiting of the cathode and anode faced to each other at both sides of the second separator. Furthermore, since electrode active materials are not coated on the region at which the cathode and anode are faced, high heat does not occur due to electric conduction by direct contact of the cathode and anode having lower resistance values.

There is no particular limit to difference in the magnitude of energy to break of the second separator relative to the first separator so long as the above-mentioned effects can be achieved. Preferably, the tensile energy to break of the second separator is less than 90% of that of the first separator. That is, the second separator preferably has at least 10% lower tensile energy to break, than the first separator. Where the difference of tensile energy to break is not large, reversal of the magnitude in tensile energy to break between the first and second separators (i.e., tensile energy to break of the second separator becomes greater than that of the first separator) may occur, due to thermal and pressure stress during a battery assembly process, and thereby this cannot ensure preferential short-circuiting upon application of external impact, contrary to the expectation as desired in the present invention. In this case, magnitude of tensile strength at break may become very large and the first and second separators employed in Examples of the present invention, as will be described hereinafter, exhibit about 100-fold difference in tensile energy to break therebetween.

Figure 2:
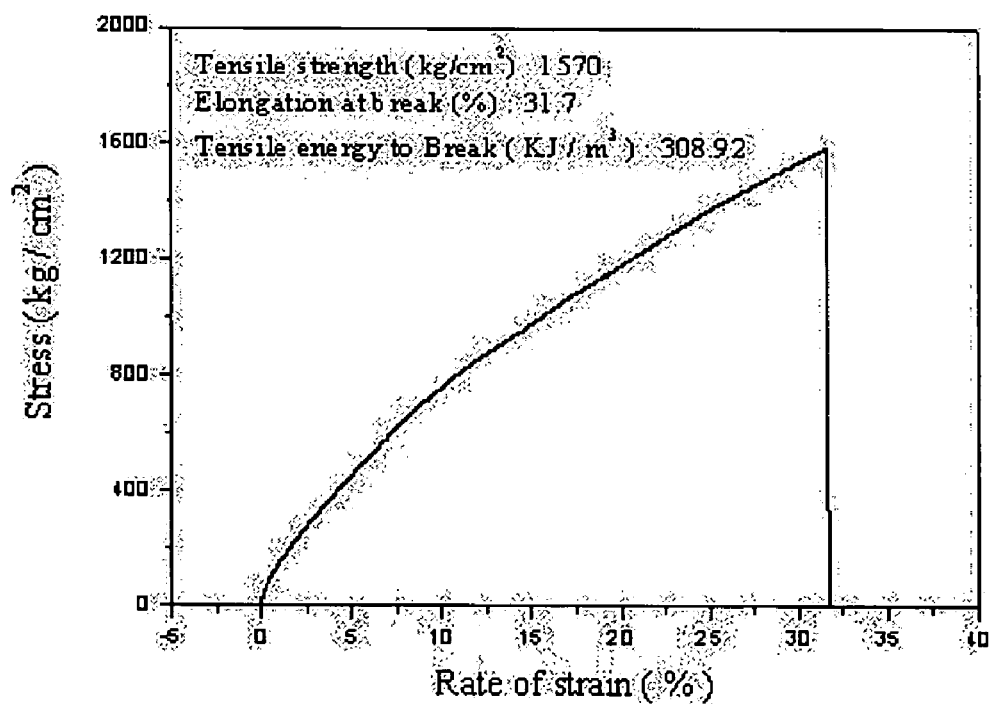
FIGS. 2 and 3 are, respectively, graphs of general stress versus strain curves obtained by measurement of separators used in examples of the present invention according to a test procedure standard, ASTM D882.
Figure 3:
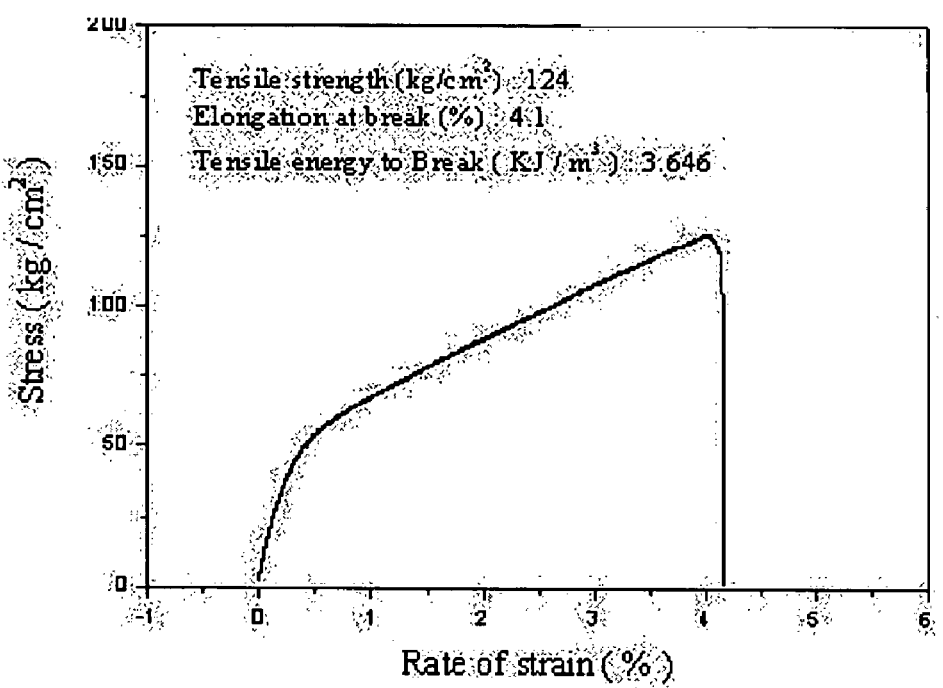

FIGS. 2 and 3 depict, respectively, stress-strain curves obtained by measurement of separators employed in Examples of the present invention according to ASTM D882. Specifically, FIG. 2 shows a tensile stress strain curve of polyethylene/polypropylene multilayer separator (Celgard 2320, available from Celgard) as the first separator, in the machine direction (MD). This separator exhibited tensile strength of about 1570 kg/cm$^2$ and tensile energy to break of about 309 KJ/m$^3$, respectively. FIG. 3 shows a stress-strain curve of a ceramic separator composed of alumina and silica as the second separator. This ceramic separator exhibited tensile strength of 124 kg/cm$^2$, and tensile energy to break of 3.6 KJ/m$^3$, thereby representing significantly lower values as compared to the polyolefin separator as the first separator.

Preferred examples of the second separator in accordance with the present invention may include, but are not limited to, ceramic separators, acrylate- or epoxy-based adhesive polymer separators. Among these, ceramic separators are particularly preferred. Preferred examples of the ceramic separators may include, but are not limited to, $Pb(Zr,Ti)O_3$ (PZT), $Pb_{1-x}La_xZr_{1-y}Ti_yO_3$ (PLZT, x and y are independently between 0 and 1), $PB(Mg_{3}Nb_{2/3})O_3$—$PbTiO_3$ (PMN-PT), $BaTiO_3$, $HfO_2$ (hafnia), $SrTiO_3$, $TiO_2$ (titania), $SiO_2$ (silica), $Al_2O_3$ (alumina), $ZrO_2$ (zirconia), $SnO_2$, $CeO_2$, MgO, CaO, $Y_2O_3$ and any combination thereof.

If necessary, a polymer, as a binder, may be added to the ceramic separator, or a ceramic layer may be added to a polymer layer. In this connection, as examples of utilizable polymers, mention may be made of polyvinylidene fluoride-co-hexafluoropropylene, polyvinylidene fluoride-co-trichloroethylene, polymethyl methacrylate, polyacrylonitrile, polyvinylpyrrolidone, polyvinylacetate, polyethylene-co-vinyl acetate, polyethylene oxide, polyethylene terephthalate, polysulfone, polyimide, polyamide, cellulose acetate, cellulose acetate butyrate, cellulose acetate propionate, carboxylmethyl cellulose, cyanoethylpullulan, cyanoethylpolyvinylalcohol, cyanoethylcellulose, cyanoethylsucrose, pullulan and any combination thereof.

Since the second separator is utilized in the outermost part of the electrode assembly and thus constitutes an electrode layer that is not used in charge/discharge of the battery, the structure of the separator is not necessarily limited to a porous structure. Therefore, any shape of separators such as films with or without pores can be employed so long as they can prevent short-circuiting of electrodes under normal operating conditions. In addition, the thickness of the second separator is not particularly limited, but may be preferably fabricated to have the thickness approximately identical to that of the first separator.

Figure 4:
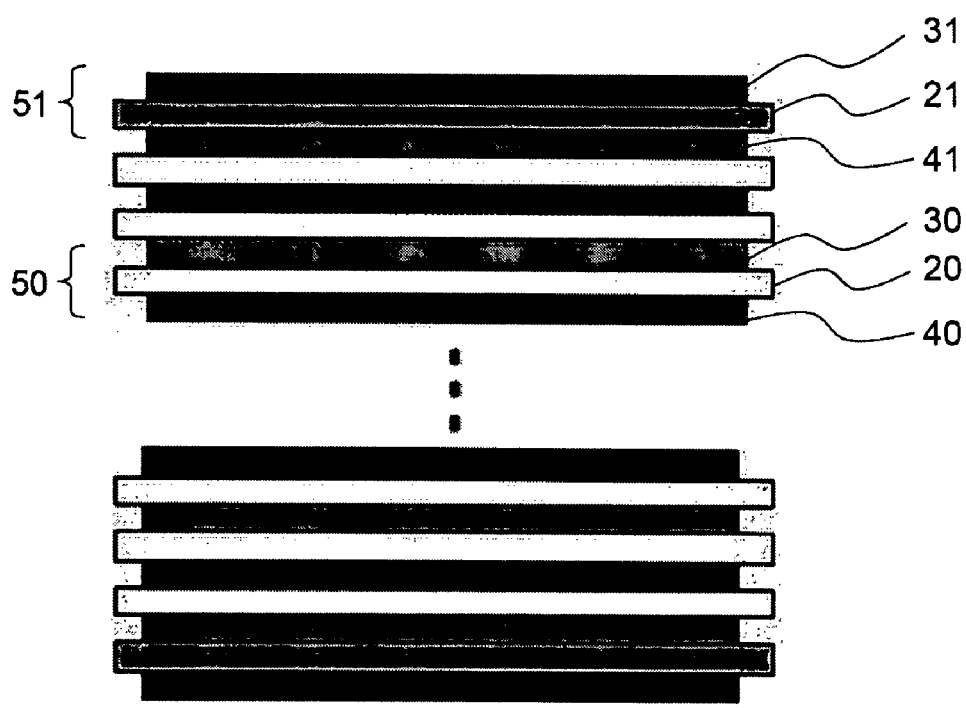
FIG. 4 is a schematic cross-sectional view of a lithium ion polymer secondary battery as one embodiment of an electrochemical device in accordance with the present invention.

As an example of the electrochemical device in accordance with the present invention, one embodiment of the lithium ion polymer secondary battery is depicted in FIG. 4. Referring to FIG. 4, a lithium ion polymer battery 10 includes an electrode layer 50 made up of a cathode 30 and an anode 40, each stacked in electrically spaced state by a first separator 20, and the outermost electrode layer 51 made up of a cathode 31 and an anode 41, each stacked in electrically spaced state by a second separator 21. The outermost electrode layer 51 is characterized in that it includes the separator 21 having relatively low energy to break compared to the first separator and the cathode 31 and anode 41, each having not been coated with electrode active materials, are faced to each other via the separator 21.

Hereinafter, lithium ion batteries or lithium ion polymer batteries in accordance with preferred embodiments of the present invention will be more specifically described.

The lithium secondary battery comprises an electrode layer including a cathode containing a lithiated transition metal oxide as a cathode active material, an anode capable of occluding and releasing lithium ions, an electrolyte and a first separator, and the outermost electrode layer including a cathode containing no cathode active material, an anode containing no anode active material, and a second separator having relatively low energy to break.

As the cathode active material for constituting the cathode, lithiated transition metal oxides are generally employed. For example, the cathode active material may be those containing lithium intercalation materials as the main component, such as lithiated manganese oxide, lithiated cobalt oxide, lithiated nickel oxide, or composite oxides formed by combination thereof. The cathode can be constituted by binding the cathode active material to a cathode current collector, i.e., aluminum, nickel or foil prepared by combination thereof.

As the anode active material for constituting the anode, lithium intercalation materials such as lithium metal or lithium alloys and carbon, petroleum coke, activated carbon, graphite, various other forms of carbon or the like may be used as the main component. The anode can be constituted by binding the anode active material to an anode current collector, i.e., copper, gold, nickel or copper alloys, or foil prepared by combination thereof.

As the electrolyte utilizable in the present invention, mention may be made of salts having a structure of $A^+B^-$, wherein $A^+$ represents alkali metal cations such as $Li^+$, $Na^+$, $K^+$ and any combination thereof, and $B^-$ represents anions such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and any combination thereof. For example, the electrolyte may be those in which lithium salts are dissolved and dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and mixtures thereof.

The first separator employs microporous polyethylene or polypropylene, or a mixture thereof, polyvinylidene fluoride, polyethylene oxide, polyacrylonitrile or polyvinylidene fluoride hexafluoropropylene copolymers.

Shapes of the lithium ion polymer secondary batteries in accordance with the present invention are not particularly limited, and batteries may be fabricated to various sizes including slim type, large type or the like. The batteries of the present invention are also equally applicable to multi cell-overlapped type, hard pack type in which the secondary battery is contained in a battery pack case, and soft pack type in which the battery is exposed to the outside without a separate case. Further, the electrode assembly may also be made in a jelly-roll type or stack type form. The stack type electrode assembly is particularly preferred.

Further, in accordance with another aspect of the present invention, there is provided an electrochemical device pack comprising one or a plurality of the above-mentioned electrochemical devices. The electrochemical device may be constituted by combination of parallel or tandem coupling.

EXAMPLES

Now, the present invention will be described in more detail with reference to the following Examples. These examples are provided only for illustrating the present invention and should not be construed as limiting the scope and sprit of the present invention.

Comparative Example 1

A battery cell utilized in this Example was a lithium ion polymer secondary battery (ICP323456™, 560 mAh, LG Chem, Korea). A second separator corresponding to reference numeral 21 in FIG. 4 employed a polyethylene based separator, identical to that utilized as a first separator corresponding to reference numeral 20, and the outermost electrode layer was constituted of active material-coated cathode and anode. Herein, a PP/PE/PP trilayer separator (Celgard 2320™, available from Celgard) was employed as a polyethylene-based separator, and $LiCoO_2$ and artificial graphite were used as the cathode and anode active materials, respectively.

Comparative Example 2

A battery was prepared using the same procedure as in Comparative Example 1, except that, as the outermost electrode layer, a cathode and anode were utilized in the form of foil which was not coated with electrode active materials. As the cathode foil, aluminum foil (Sam-A Aluminum Co., Ltd., Korea) having a thickness of 15 micrometers was used. As the anode foil, copper foil having a thickness of 15 micrometers (Nippon Foil Manufacturing Company Ltd., Japan) was used.

Example 1

As a battery cell, the same lithium ion polymer secondary battery (ICP323456™, 560 mAh, LG Chem, Korea) was employed as in Comparative Example 1. As a second separator of the outermost electrode layer, ceramic-based separator composed of alumina and silica which having low energy to break was employed. For the outermost electrode layer, active material non-coated foils were used in both cathode and anode and these foils were the same as in Comparative Example 2.

Comparative Example 3

A battery was prepared using the same procedure as in Example 1, except that, as the outermost electrode layer, a cathode and anode coated with the same electrode active materials as used in inner electrode layers.

Experimental Example 1

Figure 5:
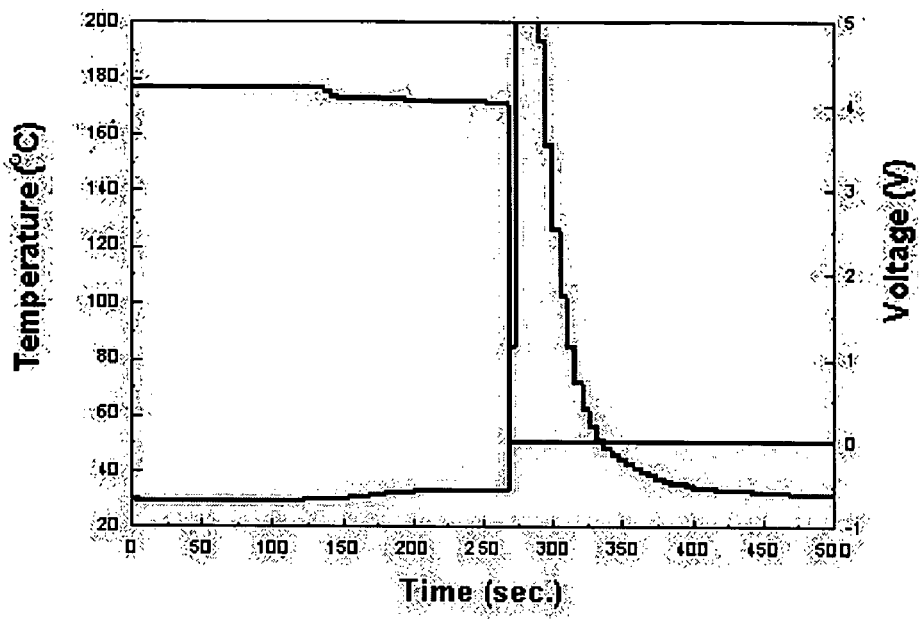
FIGS. 5 through 7 are, respectively, graphs showing changes in temperature and voltage of a battery upon performing partial crushing tests for batteries of Comparative Examples 1 and 2, and Example 1 employed in Experimental Example 1.
Figure 6:
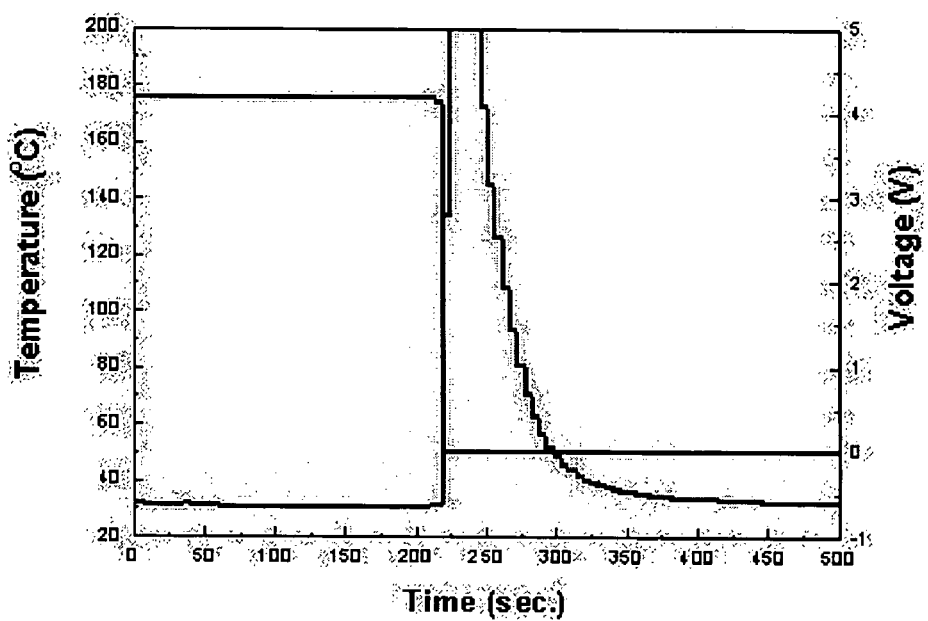
Figure 7:
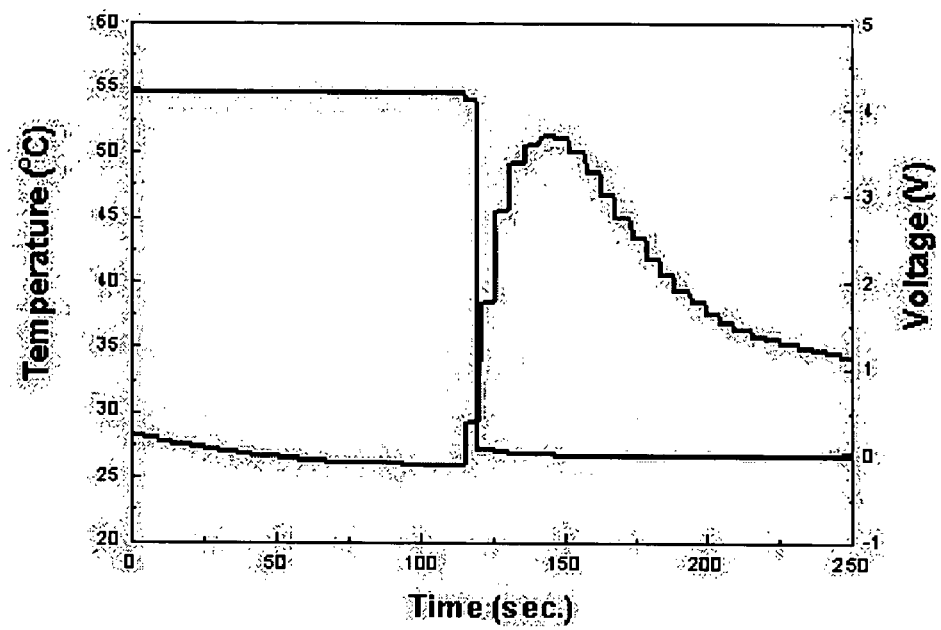

Lithium ion polymer secondary batteries prepared in Example 1 and Comparative Examples 1 through 3 were overcharged (4.25 V), respectively and then were subjected to crushing test. The crushing test was carried out by placing a disc-shaped magnet having a diameter of 1 cm and height of 0.5 cm on the battery and applying partial crushing to the battery. Changes in temperature and voltage of the batteries are shown in FIG. 5 (Comparative Example 1), FIG. 6 (Comparative Example 2) and FIG. 7 (Example 1). As shown in FIGS. 5 and 6, all batteries utilizing conventional polyethylene-based separators spontaneously ignited, thus resulting in elevated temperature of more than 200° C. Whereas, the battery utilizing the active material non-coated electrodes in the outermost electrode layer of the cell and utilizing the ceramic separator which has low energy to break and thus induces short-circuiting by early breaking in response to external impact, as shown in FIG. 7, neither exploded nor spontaneously ignited and exhibited a temperature of 60° C. (based on the surface temperature of the cell). Meanwhile, the battery (Comparative Example 3) utilizing the separator having low-energy to break in the outermost electrode layer but utilizing an electrode active material-coated cathode and anode spontaneously ignited.

As can be seen from the above crushing tests, where the outermost electrode layer was constituted of the active material non-coated electrodes and the second separator having low energy to break was disposed between both electrodes, the resulting battery exhibited remarkably improved safety as compared to where battery constitution was otherwise made. This is due to smooth heat dissipation by inducing primary short-circuiting development site to the outermost side.

Experimental Example 2

Lithium ion polymer secondary batteries prepared in Example 1 and Comparative Examples 1 through 3 were overcharged (4.25 V), respectively and then were subjected to nail penetration test. The nail penetration test was carried out by penetrating a nail having a diameter of 2.5 mm through the central part of each battery at a speed of 1000 mm/min. Changes in temperature and voltage of the batteries are shown in FIG. 8 (Comparative Example 1) and FIG. 9 (Example 1).

Figure 8:
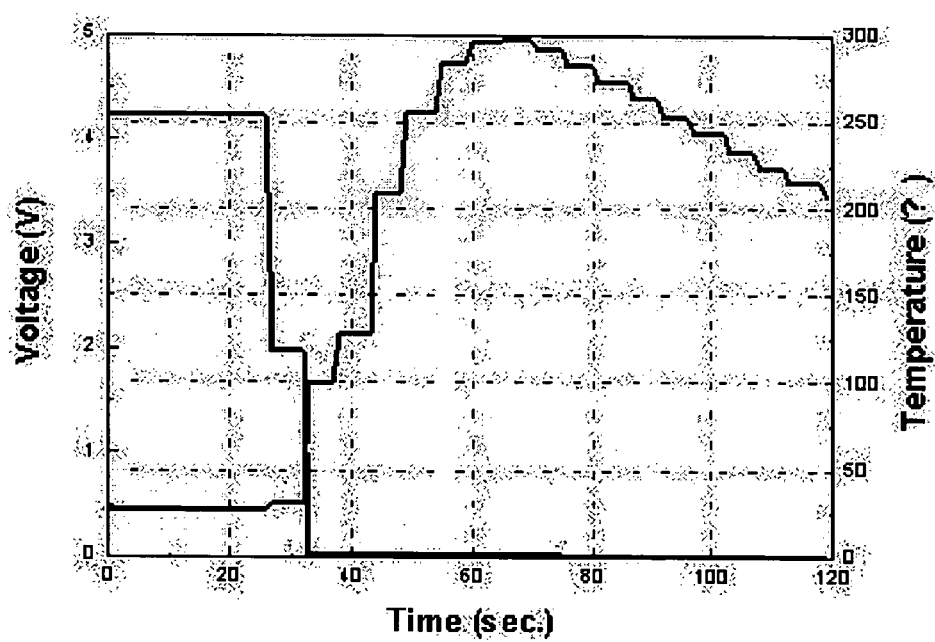
FIGS. 8 and 9 are, respectively, graphs showing changes in temperature and voltage of a battery upon performing nail penetration tests for batteries of Comparative Example 1 and Example 1 employed in Experimental Example 2.
Figure 9:
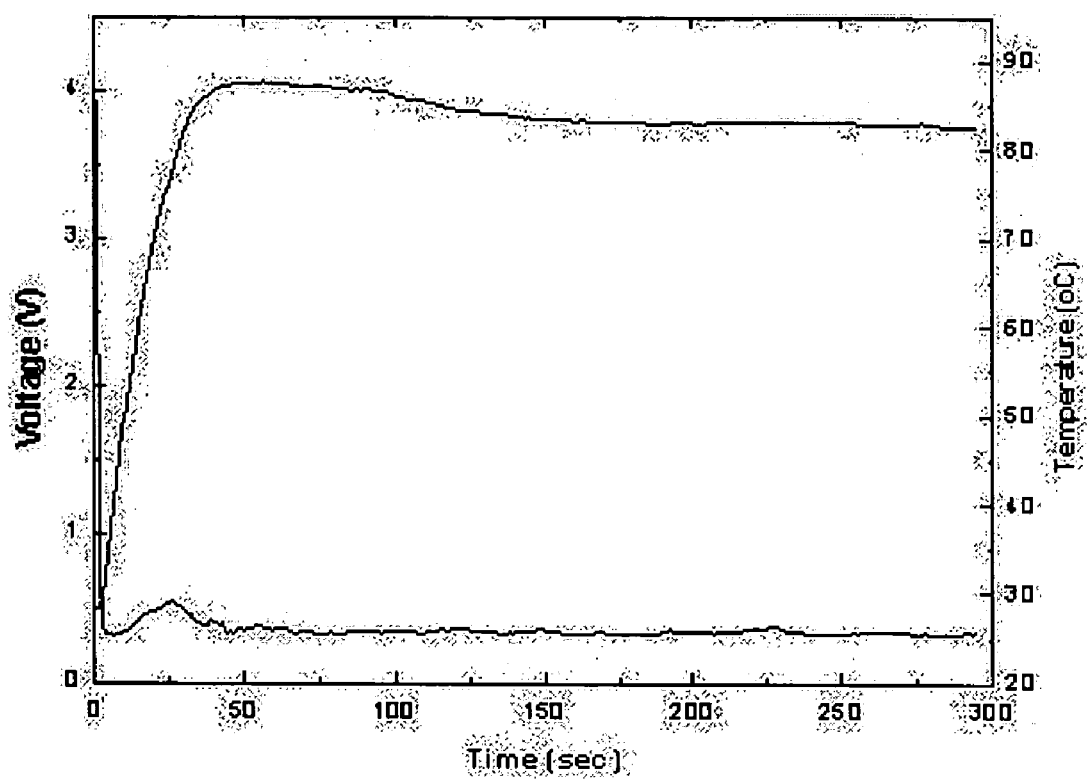

The battery of Comparative Example 1, as shown in FIG. 8, spontaneously ignited when a conventional polyethylene-based separator was used. In contrast, the battery of Example 1, as shown in FIG. 9, neither exploded nor spontaneously ignited. The battery of Comparative Example 1 spontaneously ignited, resulting in elevated temperature of more than 200° C., but the battery of Example 1 exhibited a temperature of less than 90° C. (based on the surface temperature of the cell).

As a result of other tests, there was no substantial difference in basic performance between batteries of Example 1 and Comparative Example 1, thus representing that addition of the outermost electrode layer has no effect upon cell performance.

INDUSTRIAL APPLICABILITY

As apparent from the above description, in accordance with the present invention, it is possible to improve battery safety without causing deterioration of performance thereof by constituting the battery using two different types of separators having difference in energy to break therebetween so as to cause primary short-circuiting in the outermost electrode layer including the separator having relatively low-energy to break in response to external impact.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrochemical device comprising an electrode assembly including a cathode, an anode and a separator disposed between the cathode and the anode, wherein the outermost electrode layer of the electrode assembly includes an active material non-coated cathode, an active material non-coated anode and a second separator disposed between the cathode and anode and having a relatively low energy to break compared to that of a first separator in other electrode layers, wherein the electrode layer including the second separator is positioned at both uppermost and lowermost electrode layers of the electrode assembly.

2. The electrochemical device according to claim 1, wherein the energy to break is tensile strength at break (TSB) or tensile energy to break (TEB).

3. The electrochemical device according to claim 1, wherein the tensile energy to break of the second separator is less than 90% of that of the first separator.

4. The electrochemical device according to claim 1, wherein the second separator is a ceramic separator, acrylate- or epoxy-based adhesive polymer separator or any combination thereof.

5. The electrochemical device according to claim 4, wherein the second separator is a ceramic separator.

6. The electrochemical device according to claim 5, wherein the ceramic separator is $Pb(Zr,Ti)O_3$ (PZT), $Pb_{1-x}La_xZr_{1-y}Ti_yO_3$ (PLZT, x and y are independently between 0 and 1), $PB(Mg_3Nb_{2/3})O_3$—$PbTiO_3$ (PMN-PT), $BaTiO_3$, $HfO_2$ (hafnia), $SrTiO_3$, $TiO_2$ (titania), $SiO_2$ (silica), $Al_2O_3$ (alumina), $ZrO_2$ (zirconia), $SnO_2$, $CeO_2$, MgO, CaO, $Y_2O_3$ or any combination thereof.

7. The electrochemical device according to claim 5, wherein a polymer, as a binder, is added to the ceramic separator, or a ceramic layer is added to a polymer layer.

8. The electrochemical device according to claim 7, wherein the polymer is polyvinylidene fluoride-co-hexafluoropropylene, polyvinylidene fluoride-co-trichloroethylene, polymethyl methacrylate, polyacrylonitrile, polyvinylpyrrolidone, polyvinylacetate, polyethylene-co-vinyl acetate, polyethylene oxide, polyethylene terephthalate, polysulfone, polyimide, polyamide, cellulose acetate, cellulose acetate butyrate, cellulose acetate propionate, carboxylmethyl cellulose, cyanoethylpullulan, cyanoethylpolyvinylalcohol, cyanoethylcellulose, cyanoethylsucrose, pullulan or any combination thereof.

9. The electrochemical device according to claim 1, wherein the first separator is microporous polyethylene or polypropylene, or a mixture thereof, polyvinylidene fluoride, polyethylene oxide, polyacrylonitrile or polyvinylidene fluoride hexafluoropropylene copolymer.

10. The electrochemical device according to claim 1, wherein the device is a lithium ion polymer battery and comprises an electrode layer consisting of a cathode containing lithiated transition metal oxide as a cathode active material, an anode capable of occluding and releasing lithium ions, an electrolyte and a first separator, and the outermost electrode layer consisting of a cathode containing no cathode active material, an anode containing no anode active material, and a second separator having relatively low energy to break.

11. An electrochemical device pack comprising one or a plurality of electrochemical devices of claim 1.

12. The electrochemical device pack according to claim 11, wherein the electrochemical device is constituted by combination of parallel or tandem coupling.

* * * * *